United States Patent
Hanson et al.

(10) Patent No.: US 10,031,674 B2
(45) Date of Patent: Jul. 24, 2018

(54) DIMM SSD ADDRESSING PERFORMANCE TECHNIQUES

(71) Applicants: Craig Hanson, San Jose, CA (US); Ian Swarbrick, Santa Clara, CA (US); Michael Bekerman, Los Gatos, CA (US); Chihjen Chang, Fremont, CA (US)

(72) Inventors: Craig Hanson, San Jose, CA (US); Ian Swarbrick, Santa Clara, CA (US); Michael Bekerman, Los Gatos, CA (US); Chihjen Chang, Fremont, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 54 days.

(21) Appl. No.: 15/060,596

(22) Filed: Mar. 3, 2016

(65) Prior Publication Data
US 2017/0102873 A1  Apr. 13, 2017

Related U.S. Application Data

(60) Provisional application No. 62/238,660, filed on Oct. 7, 2015.

(51) Int. Cl.
*G06F 12/00* (2006.01)
*G06F 3/06* (2006.01)

(52) U.S. Cl.
CPC .......... *G06F 3/061* (2013.01); *G06F 3/0655* (2013.01); *G06F 3/0688* (2013.01)

(58) Field of Classification Search
CPC ....... G06F 3/061; G06F 3/0655; G06F 3/0688
See application file for complete search history.

(56) References Cited

U.S. PATENT DOCUMENTS

| | | | |
|---|---|---|---|
| 6,732,249 B1 * | 5/2004 | Pickreign | G06F 12/1081 |
| | | | 711/170 |
| 8,607,003 B2 | 12/2013 | Bland et al. | |
| 2004/0215856 A1 * | 10/2004 | Leduc | G06F 13/4004 |
| | | | 710/110 |
| 2009/0154254 A1 * | 6/2009 | Wong | G06F 12/0246 |
| | | | 365/185.29 |
| 2011/0035540 A1 | 2/2011 | Fitzgerald et al. | |
| 2013/0019048 A1 * | 1/2013 | Bland | G06F 3/0659 |
| | | | 711/103 |

(Continued)

FOREIGN PATENT DOCUMENTS

WO  2013016723 A2  1/2013

*Primary Examiner* — Prasith Thammavong
(74) *Attorney, Agent, or Firm* — Renaissance IP Law Group LLP

(57) ABSTRACT

A Non-Volatile Dual In-Line Memory Module is disclosed (NVDIMM) (105). The NVDIMM (105) may be installed in a Dual In-Line Memory Module (DIMM) docket (125). The NVDIMM (105) may include a non-volatile memory (130). A device driver (160) may intercept a request for a memory address (605) destined for a host memory controller (115), replace the memory address (605) with a pre-mapped memory address (610) or an alias (705, 710) of the pre-mapped memory address (610), and send the pre-mapped memory address (610) to the host memory controller (115), so that the host memory controller (115) generates a target memory address (615) to NVDIMM (105).

19 Claims, 10 Drawing Sheets

(56) References Cited

U.S. PATENT DOCUMENTS

| | | | |
|---|---|---|---|
| 2013/0227196 A1* | 8/2013 | Zheng | G06F 13/36 711/103 |
| 2014/0181364 A1 | 6/2014 | Berke et al. | |
| 2014/0237176 A1 | 8/2014 | Takefman et al. | |
| 2014/0237205 A1 | 8/2014 | Takefman et al. | |

* cited by examiner

DIMM SSD ADDRESSING PERFORMANCE TECHNIQUES

RELATED APPLICATION DATA

This application claims the benefit of U.S. Provisional Patent Application Ser. No. 62/238,660, filed Oct. 7, 2015, which is hereby incorporated by reference.

FIELD

This inventive concept relates to memory, and more particularly to accessing a Non-Volatile Memory (NVM) device installed in a Dual In-Line Memory Module (DIMM) slot.

BACKGROUND

The requirements for a Dual In-Line Memory Module (DIMM) have been well established for a number of years. The Joint Electron Device Engineering Council (JEDEC), established originally in 1944 and given its current name in 1958, provides specifications for DIMM devices. As there are many different variants of DIMM devices, JEDEC has drafted many different standards for how DIMMs operate.

DIMMs connect to a DIMM slot connector and communicate with the host processor over memory channel address signal lines. The manner in which the host processor (and more particularly, the memory controller) and the DIMM communicate is also well established.

DIMMs are typically volatile memory. That is, the value in the memory cells needs to be refreshed periodically (the DIMM must be able to support a minimum refresh rate, again established by JEDEC), or the memory cells will lose the value stored therein.

In contrast to DIMMs, and more generally to volatile memory, Non-Volatile Memory (NVM) formats exist. NVM formats are able to retain the data values stored therein without required periodic refreshing. An example of a NVM format is NAND flash memory, often seen in Universal Serial Bus (USB) keys and Solid State Devices (SSDs).

NVM formats that may fit into a DIMM slot have been developed. But NVM formats operate according to different principals from DIMMs. For an NVM format to work in a DIMM socket, the NVM format must appear to the host processor and the memory controller as a DIMM. This creates some problems that must be resolved, as memory addressing in DIMMs operates differently than memory addressing in NVM formats.

A need remains for a way to resolve memory addressing and other issues in using NVM formats in DIMM slots.

DETAILED DESCRIPTION

Figure 1:
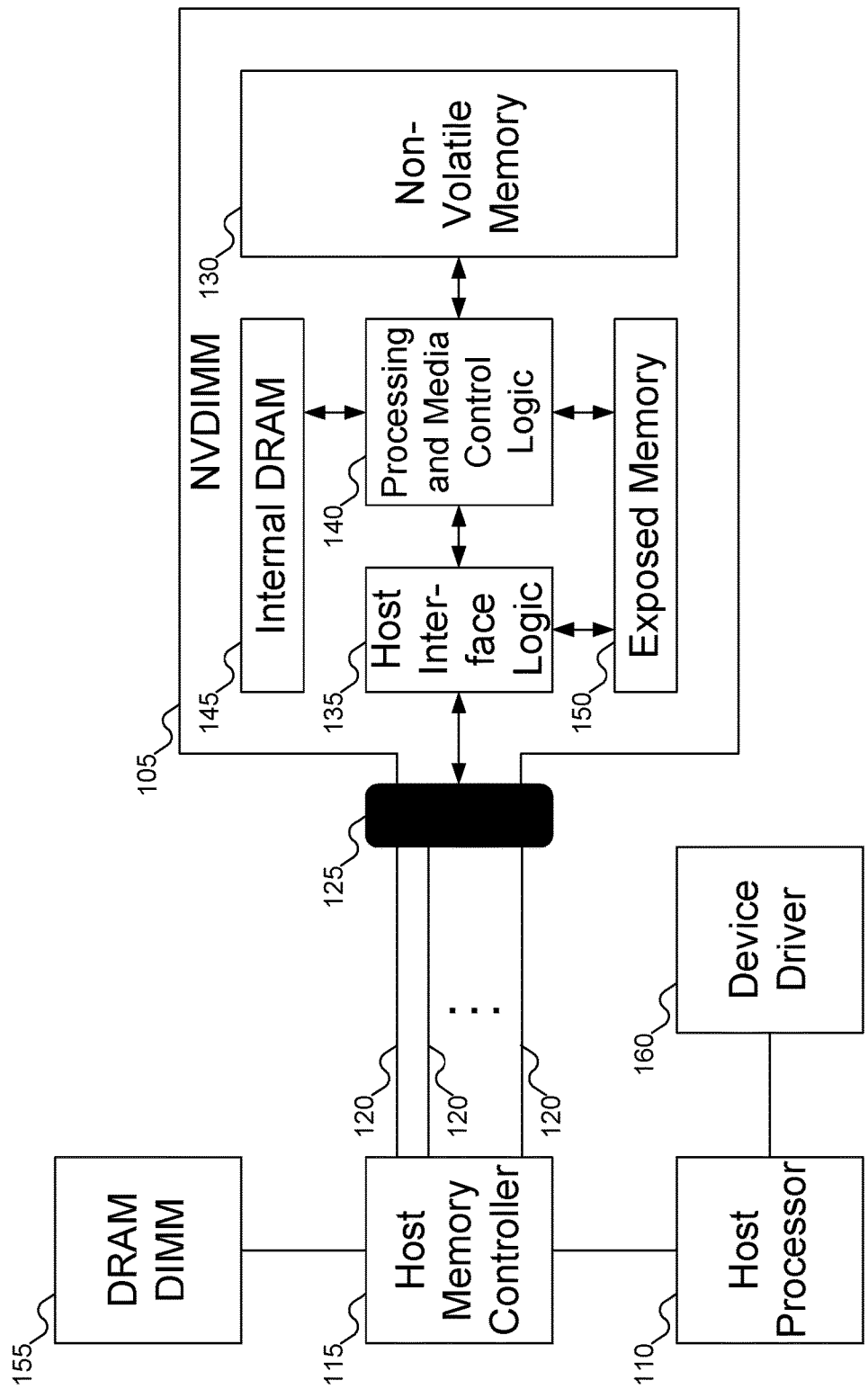
FIG. 1 shows a Non-Volatile Dual In-Line Memory Module (NVDIMM) communicating with a host processor, according to an embodiment of the inventive concept.

Reference will now be made in detail to embodiments of the inventive concept, examples of which are illustrated in the accompanying drawings. In the following detailed description, numerous specific details are set forth to enable a thorough understanding of the inventive concept. It should be understood, however, that persons having ordinary skill in the art may practice the inventive concept without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first module could be termed a second module, and, similarly, a second module could be termed a first module, without departing from the scope of the inventive concept.

The terminology used in the description of the inventive concept herein is for the purpose of describing particular embodiments only and is not intended to be limiting of the inventive concept. As used in the description of the inventive concept and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The components and features of the drawings are not necessarily drawn to scale.

Solid-State computer storage devices that use NAND Flash memory for storage media (e.g., Solid State Devices, or SSDs) provide persistent data storage services and may connect to host computers using a variety of methods. From an operational perspective, the significant components are: the host interface logic, the processing and media control logic, and the NAND Flash memory circuits that the storage devices use for persistent storage capability.

One significant host interface method is known as Non-Volatile Memory Express (NVMe). Hosts may interface with NVMe storage devices over a Peripheral Component Interconnect Express (PCIe) channel using a plurality of standardized memory-mapped Submission Queue and Completion Queue pairs.

Host processors post data Input/Output (I/O) requests to NVMe storage devices by moving commands and any associated data to assigned memory locations located within the host's Dynamic Random Access Memory (DRAM) address space. These assigned location addresses are host memory-mapped to the NVMe Submission Queues. NVMe devices may detect posted requests and retain them until device processing logic moves them into the device for fulfillment.

When NVMe devices fulfill requests, they may post responses in the Completion Queue associated with the Submission Queue that the host placed the request in. A Completion Queue, like the Submission Queue, is host memory-mapped. Hosts have a method to detect the presence of a response, access the response using memory-mapped data movement methods, and indicate they have received the response.

In contrast, to NVMe, a Non-Volatile Dual In-Line Memory Module (NVDIMM) may use a host DRAM memory channel to connect to hosts. An NVDIMM may interact with host processors significantly faster that an SSD using NVMe because they use a significantly faster host processor connection method: a memory channel's transfer rate is significantly faster than a (relatively) slower PCIe connection. But there is an added complication: since an NVDIMM is on the host memory channel, the NVDIMM must appear to host memory controllers as a standard Joint Electron Device Engineering Council (JEDEC)-compliant DRAM DIMM module, and must connect to the host memory channel using a standard DRAM DIMM socket. Specifically, an NVDIMM must completely conform to JEDEC DIMM specifications.

To conform to JEDEC DIMM specifications, an NVDIMM must report to the host that it is a DRAM DIMM with a certain memory capacity, and must be behaviorally indistinguishable from the type of DRAM DIMM it reports to be. An NVDIMM must also provide the host an interface that may operate at memory channel speeds and indistinguishably behave as system memory, for memory-mapped operations. Typically, an NVDIMM exposes a small amount of memory (which may be volatile memory such as DRAM, SRAM, etc., or may be a portion of the non-volatile memory within the NVDIMM) accessible on the memory channel, which is used for memory-mapped host data transfers.

FIG. 1 shows a Non-Volatile Dual In-Line Memory Module (NVDIMM) communicating with a host processor, according to an embodiment of the inventive concept. In FIG. 1, NVDIMM 105 is shown communicating with host processor 110 via host memory controller 115 and memory signal lines 120. Host memory controller 115 may process reads from and writes to memory (which NVDIMM 105 is providing). NVDIMM 105 interfaces with host memory controller 115 (and host processor 110) through DIMM socket 125, which may be a standard DIMM socket installed in the computer including host processor 110 and NVDIMM 105. NVDIMM 105 may include non-volatile memory 130, host interface logic 135, processing and media control logic 140, internal DRAM 145, and exposed memory 150. Non-volatile memory 130 may be any form of non-volatile storage. In one example embodiment of the inventive concept, non-volatile memory 130 may include NAND flash storage; other embodiments of the inventive concept may include other forms of non-volatile memory, such as NOR flash storage, Phase Change Memory (PCM), and Spin-Transfer Torque (STT) Magnetic RAM (MRAM). Host interface logic 135 is responsible for managing communications between host processor 110 and NVDIMM 105. Processing and media control logic 140 is responsible managing the use of non-volatile memory 130.

FIG. 1 also shows DRAM DIMM 155 interfacing with host memory controller 115. In contrast with NVDIMM 105, DRAM DIMM 155 may be a traditional DIMM module, and may provide supporting memory. For example, one of DRAM DIMM 155 and NVDIMM 105 may be used to provide a cache for the other.

Exposed memory 150 includes memory that is exposed to host processor 110 for memory-mapped activities. Exposed memory 150 may be part of internal DRAM 145, a portion of non-volatile memory 130, or a separate component of NVDIMM 105. For example, in one embodiment of the inventive concept, non-volatile memory 130 may include 8 GB of total memory, of which 1 MB may be reserved for exposed memory 150. Other embodiments of the inventive concept may include more or less total memory in non-volatile memory 130, more or less exposed memory 150, or both.

One issue that arises with using NVDIMM 105 to simulate a DIMM is that host processor 110, and more particularly programs running on host processor 110, have a special view of memory. This special view permits different applications to operate as if each had all the available (or visible) memory for its own uses. Memory controller 115 accommodates this view of memory by performing a logical-to-physical transformation of memory addresses. That is, when an application requests access to a memory location (be it to read from memory or to write to memory), the application provides the memory address it knows. This memory address is often not the actual memory address on the device where the desired memory cell is located. Memory controller 115 handles translation between these logical views of memory (as each application has its own logical view) and the physical addresses of the memory modules.

The difficulty is that exposed memory 150 in NVDIMM 105 is directly addressable memory, and does not require this logical-to-physical translation by memory controller 115. When memory controller 115 performs this logical-to-physical translation, memory controller 115 convolves the address in a way that prevents correct location of the desired memory cell.

A solution to this difficulty involves device driver 160. Device driver 160 may "pre-map" the requested memory address so that after memory controller 115 performs its logical-to-physical transformation, NVDIMM 105 receives the direct memory address it expects.

Figure 2:
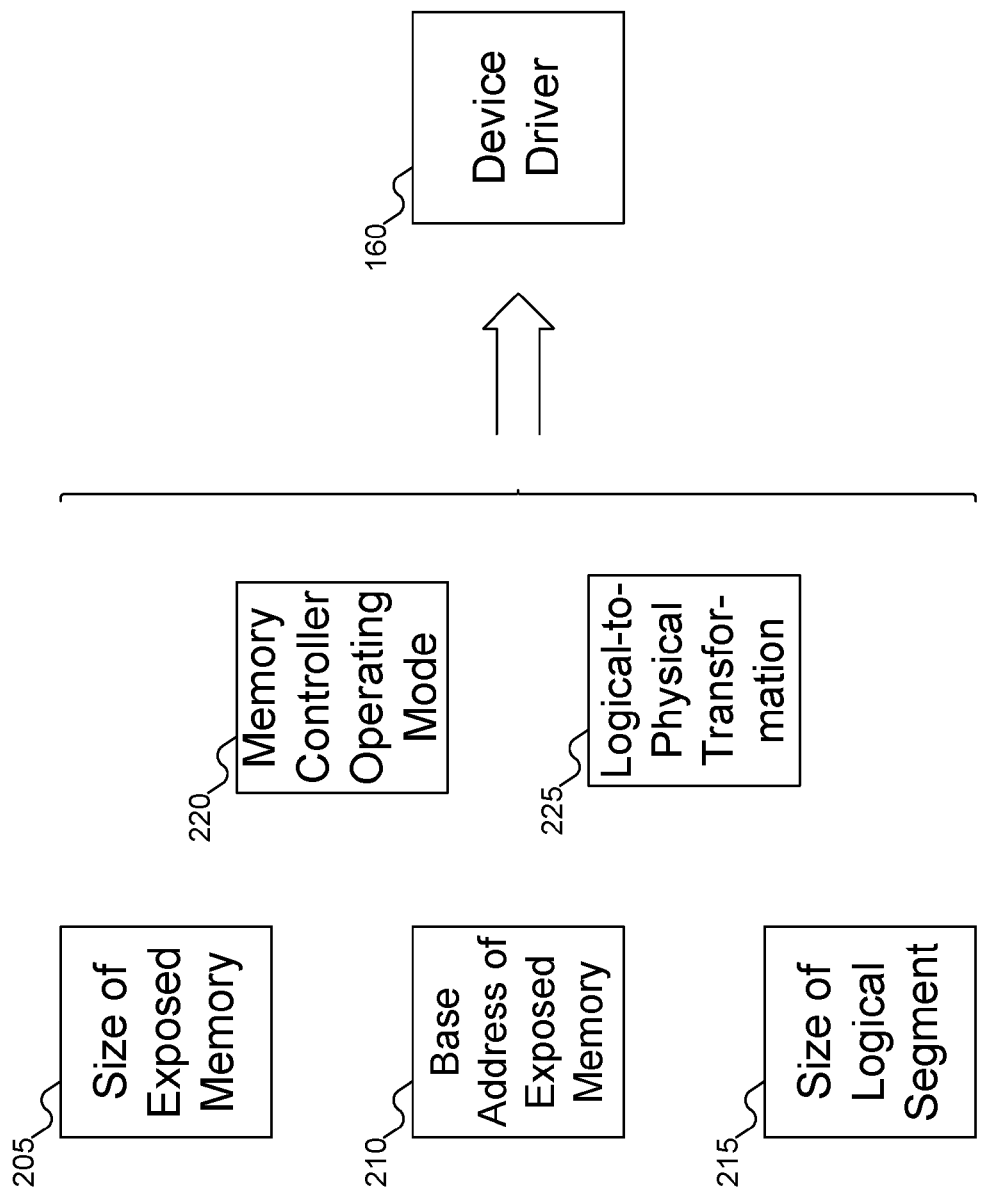
FIG. 2 shows various considerations that go into the design of the device driver of FIG. 1.

How device driver 160 performs this pre-mapping depends on a number of factors. FIG. 2 shows various considerations that go into the design of device driver 160 of FIG. 1. Among the factors that go in to the operation of device driver 160 are: size 205 of exposed memory 150, base address 210 of exposed memory 150, size 215 of a logical segment of exposed memory 150 (logical segments are discussed further with reference to FIGS. 5 and 8 below), operating mode 220 of memory controller 115, and logical-to-physical transformation 225 used by memory controller 115. Device driver 160 may probe the bus of the underlying machine to determine operating mode 220 and logical-to-physical transformation 225 of memory controller 115; the other factors are built into the design of NVDIMM 105 of FIG. 1 and would be known in advance to device driver 115.

In one embodiment of the inventive concept, operating mode 220 of memory controller 115 may operate in a page open controller mode, in which memory controller 115 assumes that memory access addresses are spaced closely together. Such requests often occur in, for example, desktop computer systems and in input/output requests. In another embodiment of the inventive concept, operating mode 220 of memory controller 115 may operate in a page closed controller mode, in which memory controller 115 assumes that there is a reduced locality of access among memory requests. Typically, memory controller 115 operates in only one mode, and does not switch modes during operation of the underlying machine (although memory controller 115 might switch to a different operating mode when the underlying machine is next started). Logical-to-physical transformation 225 may include various factors itself, such as Rank Address, Bank Group Address, Bank Address, Row Address, and Column Address.

Figure 3:
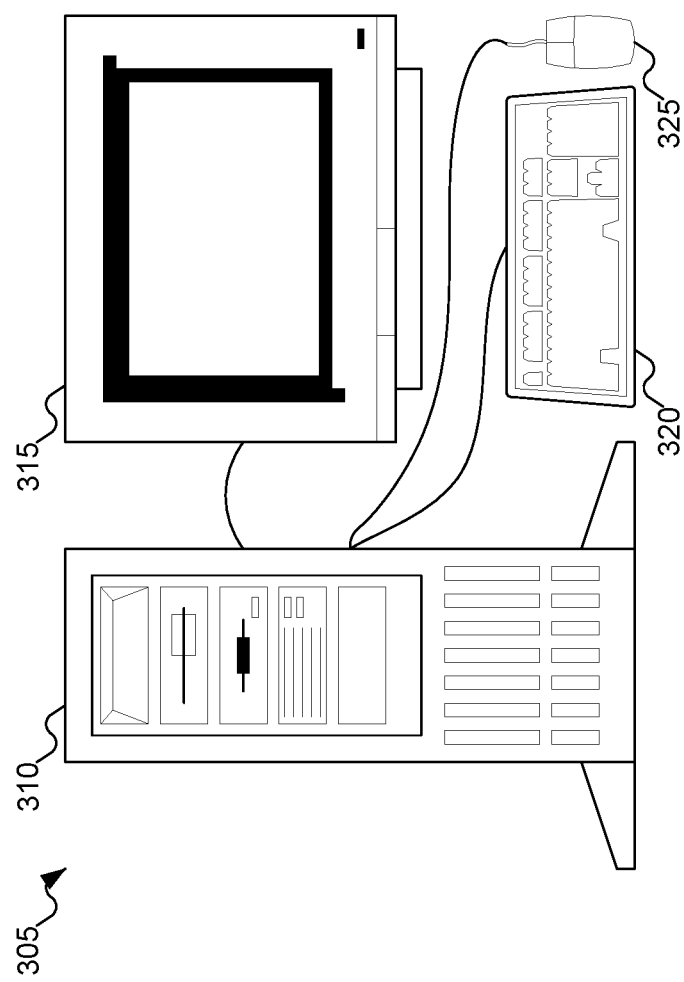
FIG. 3 shows a computer system capable of supporting the NVDIMM and host processor of FIG. 1.

Before describing an example of how device driver 160 of FIG. 1 may perform a pre-mapping, some additional information would be useful. Turning to FIG. 3, FIG. 3 shows exterior features of a computer system capable of supporting host processor 110 and NVDIMM 105 of FIG. 1. Computer system 305 is shown, which may include computer 310, monitor 315, keyboard 320, and mouse 325. A person skilled in the art will recognize that other components may be included with computer system 305: for example, other input/output devices, such as a printer, may be included. In addition, computer system 305 may include conventional internal components shown in FIG. 1, such as host processor 110 of FIG. 1, NVDIMM 105 of FIG. 1, additional storage, etc. Although not shown in FIG. 3, a person skilled in the art will recognize that computer system 305 may include other internal components, such as other graphics cards, modems, etc. In addition, a person skilled in the art will recognize that computer system 305 may interact with other computer systems, either directly or over a network (not shown) of any type. Finally, although FIG. 3 shows computer system 305 as a conventional desktop computer, a person skilled in the art will recognize that computer system 305 may be any type of machine or computing device, including, for example, a laptop computer, a tablet computer, a personal digital assistant (PDA), or a smart phone, among other possibilities.

Figure 4:
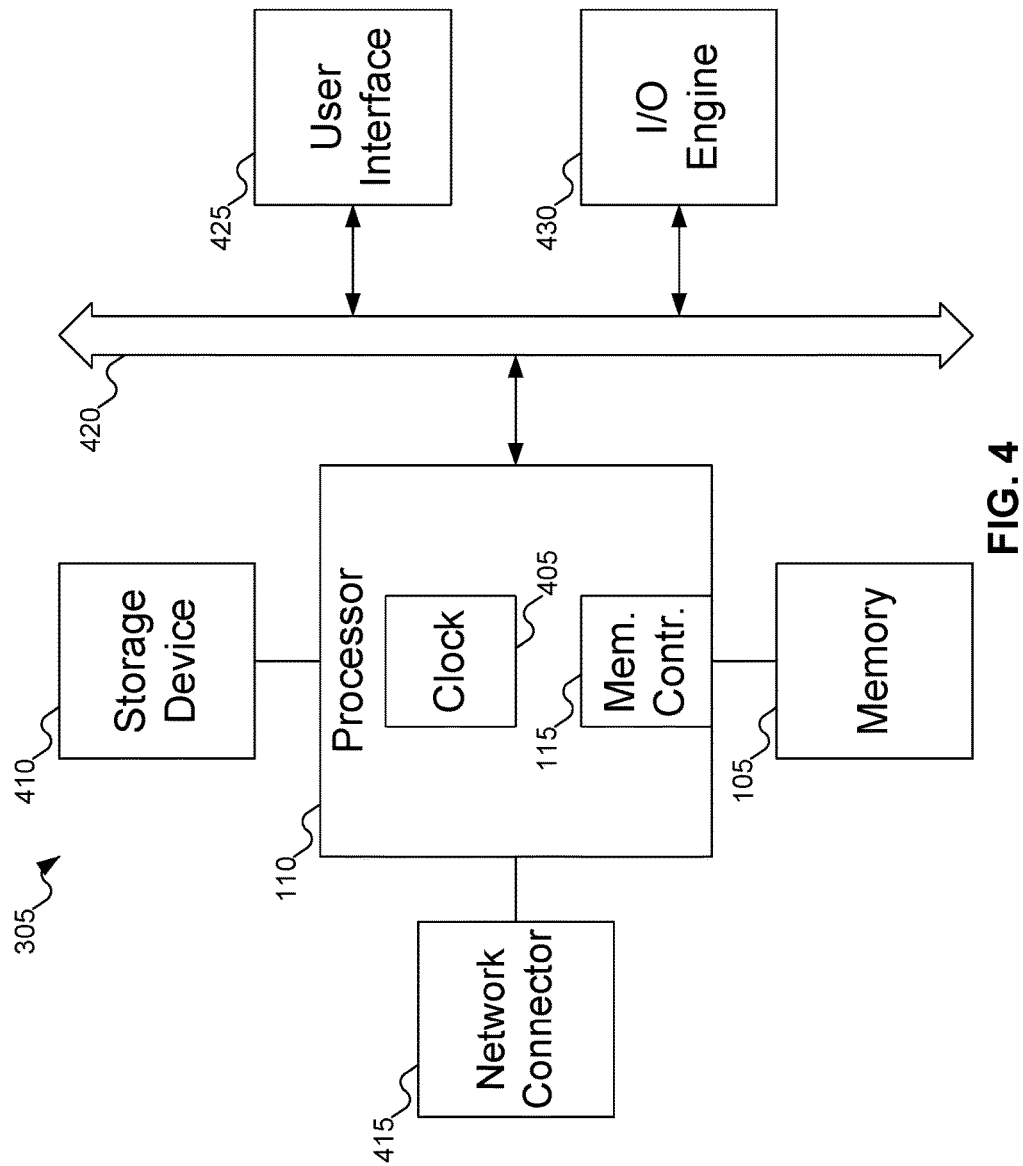
FIG. 4 shows an architecture of a machine that may use the NVDIMM of FIG. 1.

Referring to FIG. 4, typically, computer system(s) 305 may include one or more processors 110, which may include memory controller 115 and clock 405, which may be used to coordinate the operations of the components of computer system(s) 305. Processors 110 may also be coupled to memory 105, which may include random access memory (RAM), read-only memory (ROM), or other state preserving medium, as examples. Processors 110 may also be coupled to storage devices 410 and network connector 415, which may be, for example, an Ethernet connector. Processors 110 may also be connected to a bus 420, to which may be attached user interface 425 and input/output interface ports that may be managed using input/output engine 430, among other components.

Figure 5:
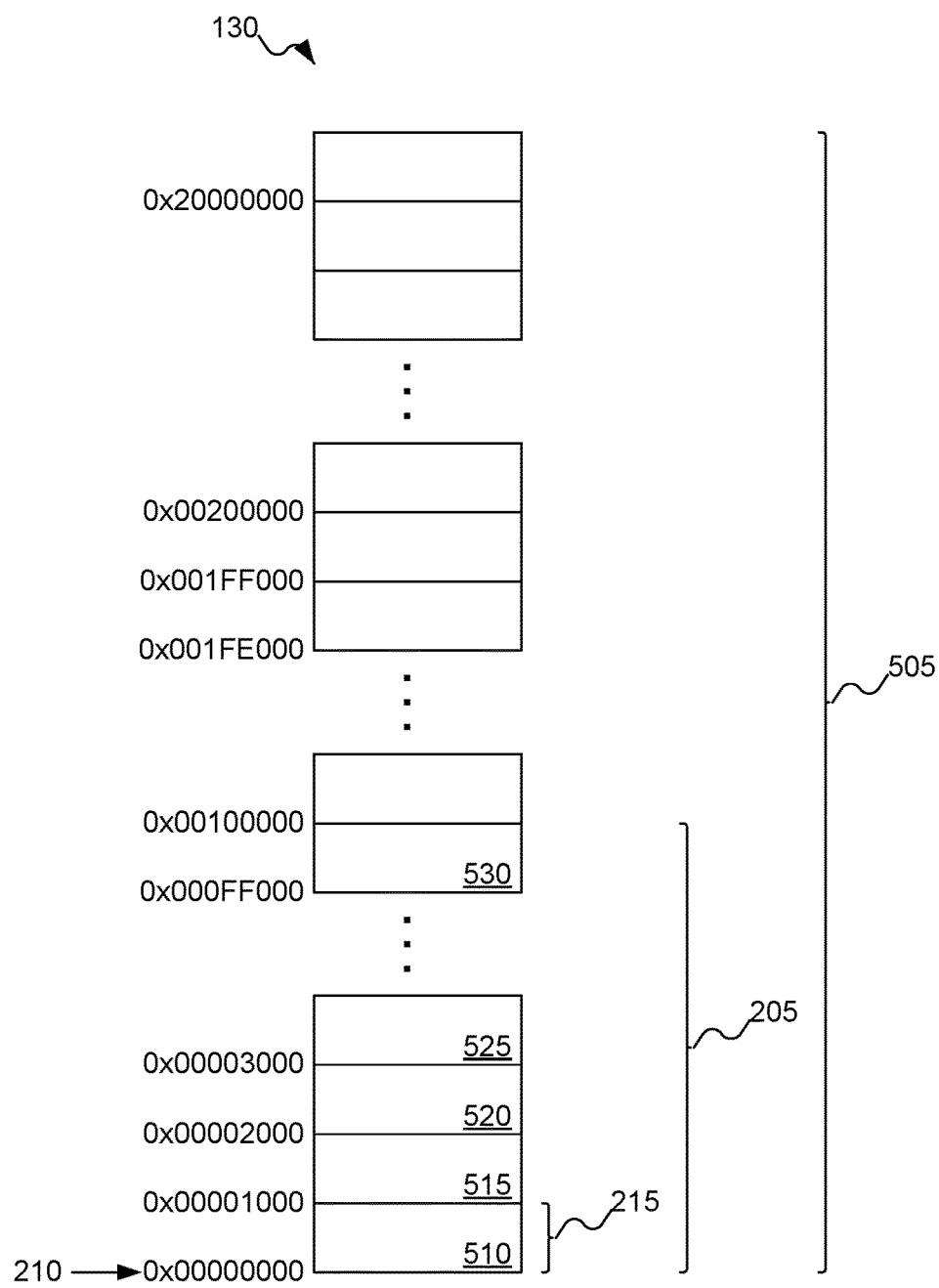
FIG. 5 shows an example layout of the memory space of the NVDIMM of FIG. 1, according to an embodiment of the inventive concept.

FIG. 5 shows an example layout of the memory space of the example NVDIMM of FIG. 1, according to embodiments of the inventive concept. In FIG. 5, non-volatile memory 130 is shown. Non-volatile memory 130 may include total capacity 505, starting at base address 210. Non-volatile memory may be divided into logical segments, such as logical segments 510, 515, 520, 525, and 530. A logical segment is a subdivision of non-volatile memory 130. Logical segments 510, 515, 520, 525, and 530 may be of any desired size 215, although typically they will include a number of bytes that is a power of 2. No relationship is required between size 215 of logical segments 510, 515, 520, 525, and 530 and total capacity 505 of non-volatile memory 130, or even between size 215 of logical segments 510, 515, 520, 525, and 530 and size 205 of exposed memory 150. But if size 215 of logical segments 510, 515, 520, 525, and 530 is too small, each logical segment 510, 11, 520, 525, and 530 might have insufficient storage for a memory request.

FIG. 5 shows an example embodiment of the inventive concept in which total capacity 505 of non-volatile memory 130 is 8 GB, size 205 of exposed memory 150 is 1 MB, and size 215 of each logical segment is 4 KB. But other embodiments of the inventive concept may support other values for any or all of sizes 215 of each logical segment, sizes 205 of exposed memory 150, and total capacities 505 of non-volatile memory 130. In addition, while FIG. 5 (and FIG. 8 below) show exposed memory 150 as a portion of non-volatile memory 130, exposed memory 150 may be separate from non-volatile memory 130.

Figure 6:
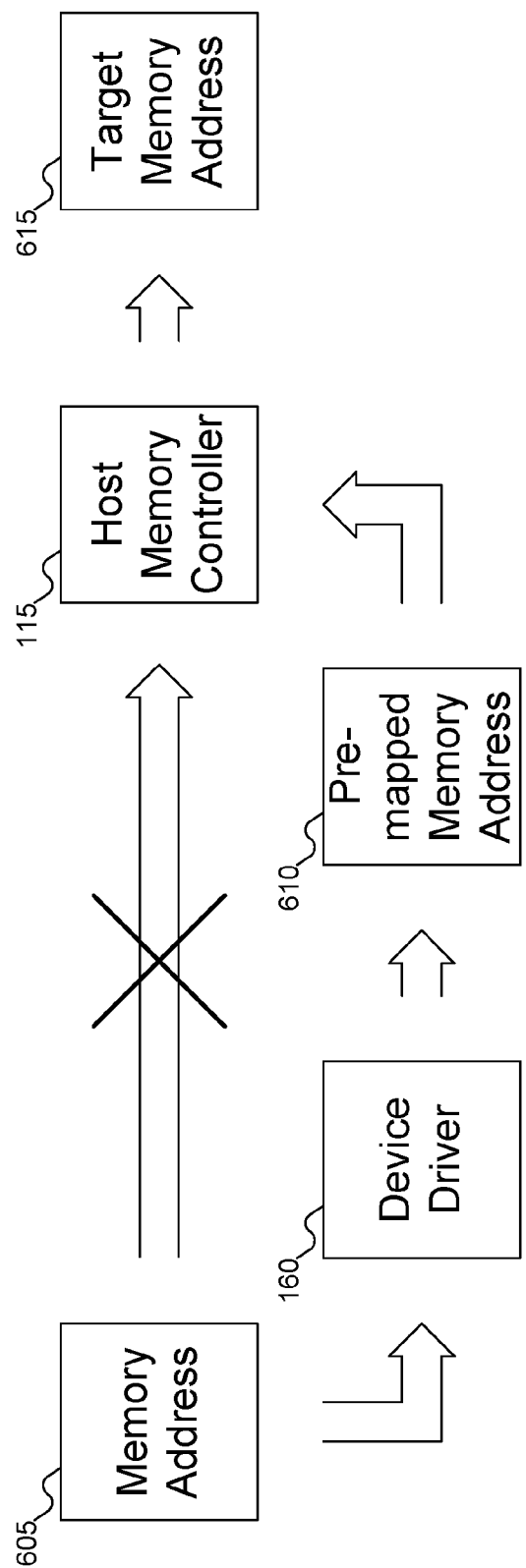
FIG. 6 shows the device driver of FIG. 1 intercepting a request to access a memory address in the NVDIMM of FIG. 1 and pre-mapping the requested memory address, according to an embodiment of the inventive concept.

FIG. 6 shows an example of device driver 160 of FIG. 1 intercepting a request to access a memory address in the NVDIMM of FIG. 1 and pre-mapping the requested memory address, according to an embodiment of the inventive concept. In FIG. 6, an application (or some other process) may issue memory request 605, which corresponds to a memory address in NVDIMM 105 of FIG. 1. Rather than permitting memory request 605 to proceed to host memory controller 115 (which would perform logical-to-physical transformation 225 of FIG. 2), device driver 160 may intercept memory request 605 and pre-map the memory address. The result of the pre-mapping is pre-mapped memory address 610 (which may also be termed an intermediate address). Device driver 160 may then deliver pre-mapped memory address 610 to host memory controller 115, which may perform logical-to-physical transformation 225 on pre-mapped memory address 610. The result is target memory address 615: the actual address at which NVDIMM 105 of FIG. 1 stores the desired memory cell.

Returning to FIG. 1, within a host system, all DRAM subsystem address signals arrive at each DIMM socket, including DIMM socket 125 populated with NVDIMM 105. To achieve the address dispersion, device driver 160 uses some signals to identify the correct NVDIMM exposed logical memory segment. The values on the remaining signals are not relevant to the mapping (although the values on those signals may be used by NVDIMM 105 of FIG. 1). As discussed above, the precise mapping may vary and may depend on logical segment size 215 and host memory controller operating mode 220.

As an example of how device driver 160 may operate to perform the pre-mapping, assume that NVDIMM 105 includes total capacity 505 of FIG. 5 of 8 GB, size 205 of FIG. 2 of exposed memory 150 of 1 MB, and logical block size 215 of FIG. 2 of 4 KB. Further assume that exposed memory 150 maps to the following input address bits (on memory signal lines 120): {row[2:0], column[9:0], ba[1:0], bg[1:0], 3'b000}. (The previous is a Verilog concatenation description, which is not how the mapping would necessarily be described in a hardware specification document, but is readily understood.)

If memory controller operating mode 220 is a page open mode, then logical-to-physical transformation 225 of FIG. 1 might, for example, map bits according to the following transformation: {rank[1:0], row[16:0], ba[1:0], bg[1:0], column[9:0], 3'h0}, and device driver 160 could then pre-map the memory address using the mapping {16'hxxxx, row[2:0], ba[1:0], bg[1:0], column[9:0], 3'h0}, where "x" represents a "don't care" value (any value may be used without changing the result).

On the other hand, if memory controller operating mode 220 is a page closed mode, then logical-to-physical transformation 225 of FIG. 1 might, for example, map bits according to the following transformation: {rank[1:0], column[9:3], row[16:0], ba[1:0], bg[1:0], column[2:0], 3'h0}, and device driver 160 could then pre-map the memory address using the mapping {2'hx, column[9:3], 14'hxxxx, row[2:0], ba[1:0], bg[1:0], column[2:0], 3'h0}, again where "x" represents a "don't care" value.

The example pre-mappings shown above are construct rather than being necessarily realistic mappings. The address bits in each group from the DRAM specification was used (i.e., the number of row bits, the number of column bits, the number of bank bits, and the number of bank group bits), and then chosen as an example breakdown relative to system address. But pre-mappings for real-world memory controllers may be constructed in a similar manner.

By using memory signal lines 120, NVDIMM 105 may interact with host processor 160 significantly faster that a non-volatile memory device operating using Non-Volatile Memory Express (NVMe). This fact is a simple consequence of the fact that a memory channel's transfer rate is significantly faster than a (relatively) slower Peripheral Component Interconnect Express (PCIe) connection. But there is a potential complication. Because all memory-mapped I/O activity occurs within a very narrow address range (for example, 1 Mbyte in the example described above with reference to FIG. 5), NVDIMM 105 is potentially exposed to a serious performance constraint caused by a DRAM DIMM standard deficiency know as Row Hammer.

Expressed simply, Row Hammer is when repeated accesses to a particular memory cell may corrupt (induce a change in) one or more nearby memory cells. Rom Hammer was not known to the JEDEC standards committee when the DRAM standards were originally developed. To address Row Hammer, newer JEDEC specifications permit memory controllers, such as memory controller 115 of FIG. 1 to "throttle" (slow the frequency of) accesses to the same DRAM row (a provision known as Target Row Refresh).

While slowing access to a particular DRAM row may prevent Row Hammer, slowing the frequency of access also slows down the operation of memory. And when memory that is not subject to Row Hammer is used, such as NVDIMM 105 of FIG. 1, throttling is unnecessary. But because NVDIMM 105 of FIG. 1 needs to appear to be an ordinary DIMM (to comply with JEDEC specifications and interface correctly with host processor 110), memory controller 115 does not know that Row Hammer is not a concern.

The smaller the address range of exposed memory 150 of FIG. 1, the higher the probability that memory controller 115 of FIG. 1 will throttle requests to NVDIMM 105 of FIG. 1, to avoid Row Hammer. Thus, it would be useful to prevent memory controller 115 from thinking that Row Hammer is a concern.

Figure 7:
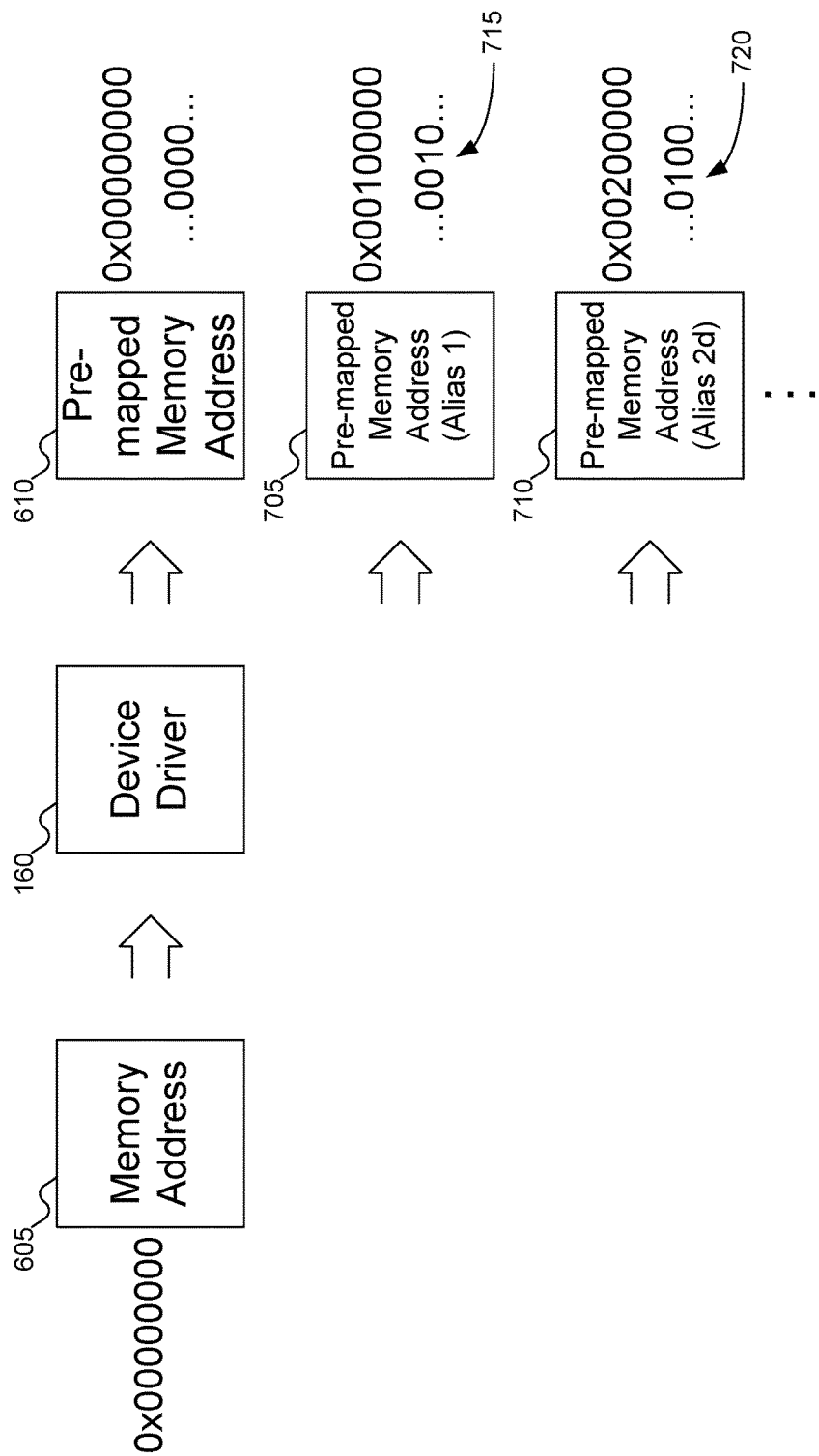
FIG. 7 shows the device driver of FIG. 1 performing address aliasing, according to an embodiment of the inventive concept.

One way to prevent memory controller of FIG. 1 from thinking that Row Hammer is a concern is to alias memory addresses before they reach memory controller 115 of FIG. 1. FIG. 7 shows an example of how device driver 160 may use aliasing.

FIG. 7 shows the device driver of FIG. 1 performing address aliasing, according to an embodiment of the inventive concept. In FIG. 7, device driver 160 may pre-map memory address 605 to pre-mapped memory address 610. But as noted above in the example pre-maps, the pre-map may include bits whose value is not relevant: any value may be used. By changing one or more of the "don't care" bits that map to physical row bits in host memory controller 115 of FIG. 1, an alias may be produced for target memory address 615 of FIG. 6. So, for example, pre-map aliases 705 and 710 each represent aliases for the desired memory address, but include different bit patterns (specifically, different bit patterns in the "don't care" bits).

Device driver 160 may use any desired technique for changing "don't care" bits to generate an alias. In one embodiment of the inventive concept, device driver 160 may generate random (or pseudo-random) values for the "don't care" bits. In another embodiment of the inventive concept, device driver 160 may generate sequential values for the "don't care" bits. Other embodiments of the inventive concept may include yet other ways to generate values for the "don't care" bits.

In some embodiments of the inventive concept, device driver 160 may track which memory addresses have been accessed, and only change "don't care" bits when it appears that memory controller 115 of FIG. 1 will throttle access to NVDIMM 105 of FIG. 1. In other embodiments of the inventive concept, device driver 160 may change the value of the "don't care" bits at each memory access, without regard for whether memory controller 115 of FIG. 1 might otherwise throttle access to NVDIMM 105 of FIG. 1.

Figure 8:
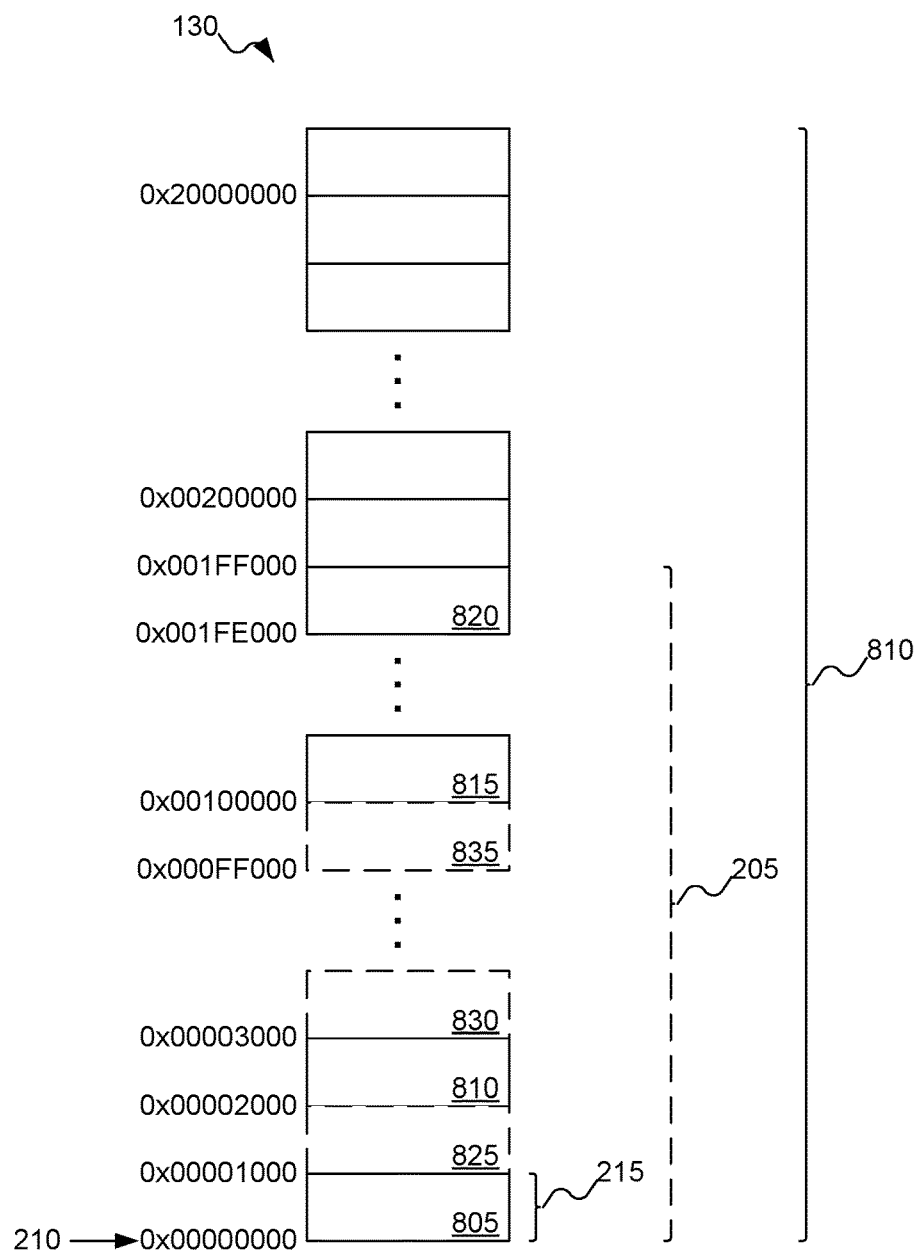
FIG. 8 shows a second example layout of the memory space of the NVDIMM of FIG. 1, according to a second embodiment of the inventive concept.

Another way to prevent memory controller 115 of FIG. 1 from thinking that Row Hammer is a concern is to partition exposed memory 150 of FIG. 1 into logical segments with non-contiguous memory addresses. FIG. 8 shows an example of how exposed memory 150 of FIG. 1 may be partitioned into logical segments with non-contiguous memory addresses.

FIG. 8 shows a second example layout of the memory space of the NVDIMM of FIG. 1, according to a second embodiment of the inventive concept. In FIG. 8, exposed memory 150 of FIG. 1 includes only some of the logical segments in size 205 (which is larger than the actual size of exposed memory 150 of FIG. 1). For example, exposed memory 150 of FIG. 1 might include only logical segments 805, 810, 815, and 820: logical segments 825, 830, and 835, while within the range of size 205, are not part of exposed memory 150 of FIG. 1. Because the memory addresses for the logical segments within exposed memory 150 are not contiguous, Row Hammer is no longer a consideration.

Figure 9:
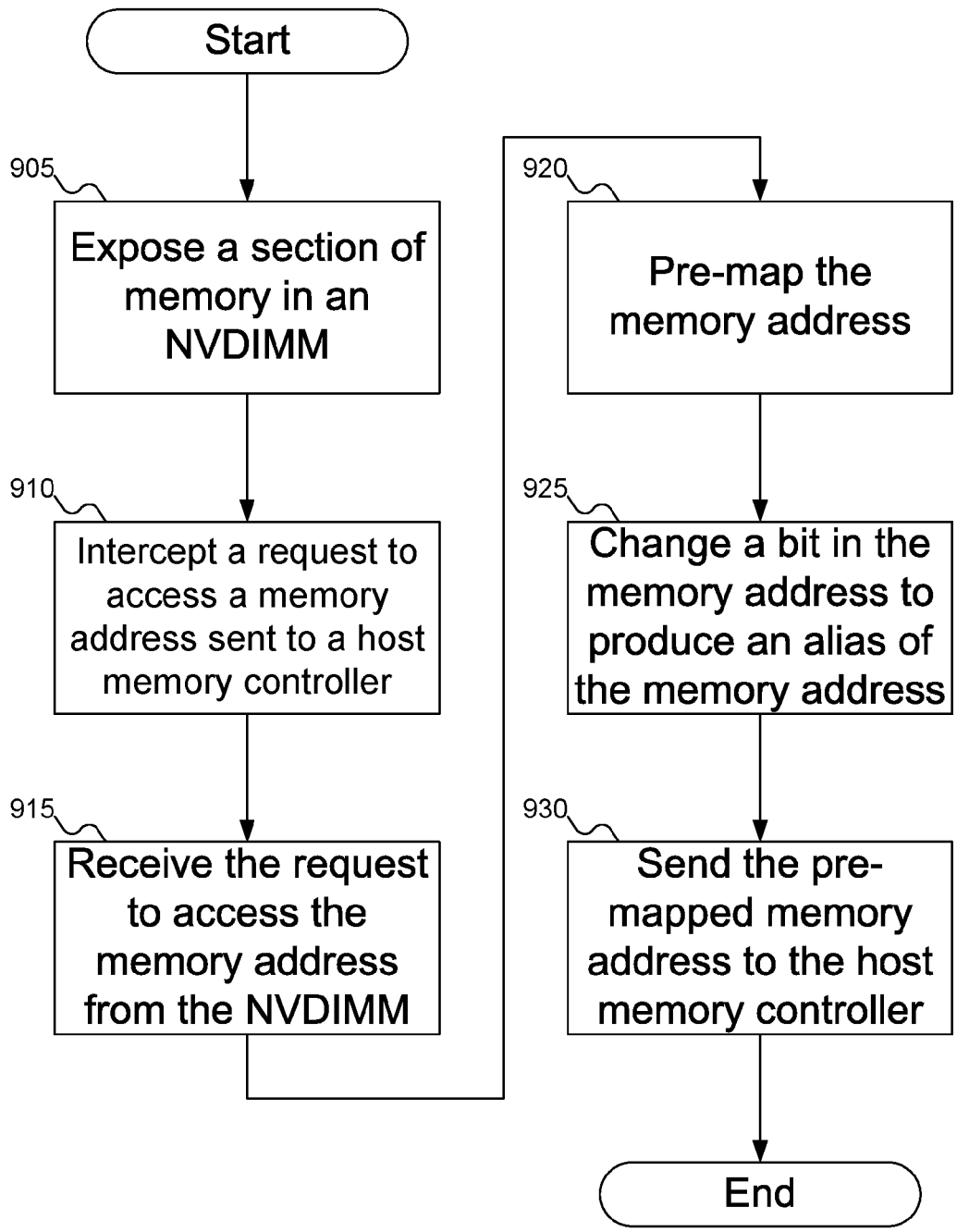
FIG. 9 shows a flowchart of a procedure for how the NVDIMM of FIG. 1 and the device driver of FIG. 1 handle requests for memory addresses in the NVDIMM of FIG. 1, according to an embodiment of the inventive concept.

FIG. 9 shows a flowchart of an example procedure for how NVDIMM 105 of FIG. 1 and device driver 160 of FIG. 1 may handle requests for memory addresses 150 in NVDIMM 105 of FIG. 1, according to an embodiment of the inventive concept. In FIG. 9, at block 905, NVDIMM 105 of FIG. 1 may open exposed memory 150 of FIG. 1 to the host computer (and more particularly, to memory controller 115 of FIG. 1). At block 910, device driver 160 of FIG. 1 may intercept a request to access memory address 605 of FIG. 1, destined for memory controller 115 of FIG. 1. At block 915, device driver 160 of FIG. 1 may receive the request to access memory address 605 of FIG. 6. At block 920, device driver 160 of FIG. 1 may pre-map memory address 605 of FIG. 6 to produce pre-mapped memory address 610 of FIG. 6. At block 925, device driver 160 of FIG. 1 may change one or more bits in pre-mapped memory address 610 of FIG. 6 to produce alias 705 or 710 of FIG. 7 of memory address 605. As described above with reference to FIG. 7, producing alias 705 or 710 of FIG. 7 of pre-mapped memory address 610 of FIG. 1 is optional, and therefore block 925 is optional. Finally, at block 930, device driver 160 of FIG. 1 may send pre-mapped memory address 610 of FIG. 6, or alias 705 or 710 of FIG. 7, to memory controller 115 of FIG. 1.

Figure 10:
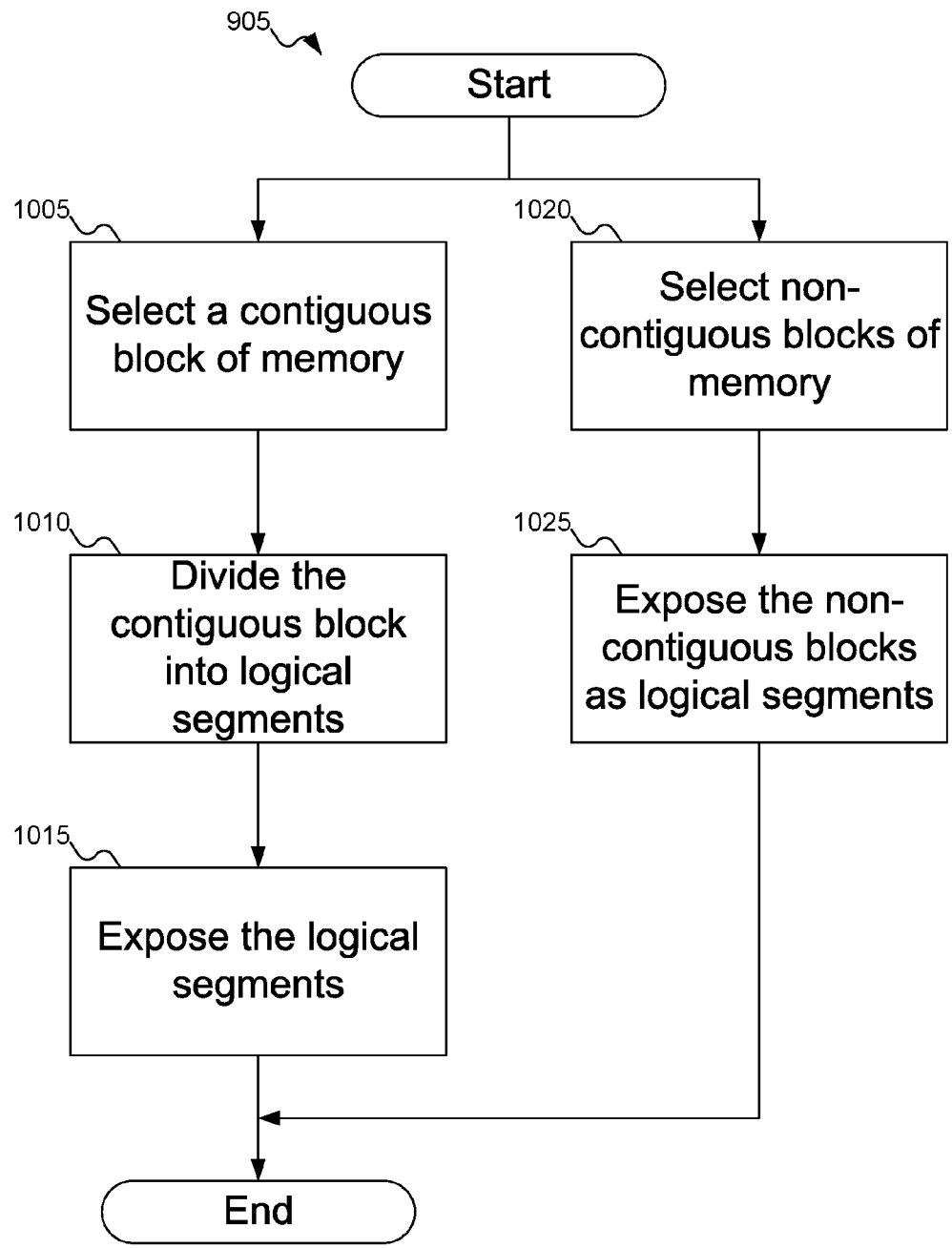
FIG. 10 shows a flowchart of a procedure for how the NVDIMM of FIG. 1 may expose memory to the host computer of FIG. 1, according to an embodiment of the inventive concept.

FIG. 10 shows a flowchart of a procedure for how NVDIMM 105 of FIG. 1 may expose memory 150 to the host computer of FIG. 1, according to an embodiment of the inventive concept. In FIG. 10, at block 1005, NVDIMM 105 of FIG. 1 may select a block of contiguous memory in non-volatile memory 130 of FIG. 1. (As described earlier, exposed memory 150 of FIG. 1 may also be stored elsewhere than in non-volatile memory 130 of FIG. 1: except for changing where exposed memory 150 of FIG. 1 is stored, the flowchart of FIG. 10 may be used without modification in such situations.) NVDIMM 105 of FIG. 1 may select the block of contiguous memory in any desired manner. For example, NVDIMM 105 of FIG. 1 may select a contiguous block of memory starting at base address 0, or ending at the upper end of total capacity 505 of FIG. 5, or any other contiguous block of memory. At block 1010, NVDIMM 105 of FIG. 1 may divide the contiguous block of memory into logical segments (e.g., logical segments 510, 515, 520, 525, and 530 of FIG. 5). At block 1015, NVDIMM 105 of FIG. 1 may expose logical segments, such as logical segments 510, 515, 520, 525, and 530 of FIG. 5, as exposed memory 150 of FIG. 1.

Alternatively, at block 1020, NVDIMM 105 of FIG. 1 may select non-contiguous blocks of memory in non-volatile memory 130 of FIG. 1, each of the blocks being a uniform size 215 of FIG. 2. Just as with block 1005, NVDIMM 105 of FIG. 1 may select the non-contiguous blocks in any desired manner. At block 1025, NVDIMM 105 of FIG. 1 may expose the non-contiguous blocks of memory as logical segments 805, 810, 815, and 820.

While FIG. 10 suggests that NVDIMM 105 of FIG. 1 exposes either a contiguous block of memory or non-contiguous blocks, other embodiments of the invention may combine both variations. For example, 4 large portions of non-volatile memory 130 of FIG. 1 may be identified (each portion itself being a contiguous block), and each portion may be divided into logical segments that may be exposed by NVDIMM 105 of FIG. 1.

In FIGS. 9-10, one embodiment of the inventive concept is shown. But a person skilled in the art will recognize that other embodiments of the inventive concept are also possible, by changing the order of the blocks, by omitting blocks, or by including links not shown in the drawings. All such variations of the flowcharts are considered to be embodiments of the inventive concept, whether expressly described or not.

The following discussion is intended to provide a brief, general description of a suitable machine or machines in which certain aspects of the inventive concept may be implemented. The machine or machines may be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine or machines may include embedded controllers, such as programmable or non-programmable logic devices or arrays, Application Specific Integrated Circuits (ASICs), embedded computers, smart cards, and the like. The machine or machines may utilize one or more connections to one or more remote machines, such as through a network interface, modem, or other communicative coupling. Machines may be interconnected by way of a physical and/or logical network, such as an intranet, the Internet, local area networks, wide area networks, etc. One skilled in the art will appreciate that network communication may utilize various wired and/or wireless short range or long range carriers and protocols, including radio frequency (RF), satellite, microwave, Institute of Electrical and Electronics Engineers (IEEE) 802.11, Bluetooth®, optical, infrared, cable, laser, etc.

Embodiments of the present inventive concept may be described by reference to or in conjunction with associated data including functions, procedures, data structures, application programs, etc. which when accessed by a machine results in the machine performing tasks or defining abstract data types or low-level hardware contexts. Associated data may be stored in, for example, the volatile and/or non-volatile memory, RAM, ROM, etc., or in other storage devices and their associated storage media, including hard-drives, floppy-disks, optical storage, tapes, flash memory, memory sticks, digital video disks, biological storage, etc. Associated data may be delivered over transmission environments, including the physical and/or logical network, in the form of packets, serial data, parallel data, propagated signals, etc., and may be used in a compressed or encrypted format. Associated data may be used in a distributed environment, and stored locally and/or remotely for machine access.

Embodiments of the inventive concept may include a tangible, non-transitory machine-readable medium comprising instructions executable by one or more processors, the instructions comprising instructions to perform the elements of the inventive concepts as described herein.

Having described and illustrated the principles of the inventive concept with reference to illustrated embodiments, it will be recognized that the illustrated embodiments may be modified in arrangement and detail without departing from such principles, and may be combined in any desired manner. And, although the foregoing discussion has focused on particular embodiments, other configurations are contemplated. In particular, even though expressions such as "according to an embodiment of the inventive concept" or the like are used herein, these phrases are meant to generally reference embodiment possibilities, and are not intended to limit the inventive concept to particular embodiment configurations. As used herein, these terms may reference the same or different embodiments that are combinable into other embodiments.

The foregoing illustrative embodiments are not to be construed as limiting the inventive concept thereof. Although a few embodiments have been described, those skilled in the art will readily appreciate that many modifications are possible to those embodiments without materially departing from the novel teachings and advantages of the present disclosure. Accordingly, all such modifications are intended to be included within the scope of this inventive concept as defined in the claims.

Embodiments of the inventive concept may extend to the following statements, without limitation:

Statement 1. An embodiment of the inventive concept includes a device, comprising:

a Non-Volatile Dual In-Line Memory Module (NVDIMM) (105) installed in a Dual In-Line Memory Module (DIMM) socket (125), the NVDIMM (105) including a memory (130) and an exposed memory (150), the exposed memory (150) including a first size (205) of the exposed memory (150) and a base address (210) of the exposed memory (150); and a device driver (160) operating on a host processor (110), the device driver (160) operative to intercept a memory address (605) destined for a host memory controller (115) and replace the memory address (605) with a pre-mapped memory address (610), the pre-mapped memory address (610) different from the memory address (605).

Statement 2. An embodiment of the inventive concept includes a device according to statement 1, wherein the NVDIMM (105) includes an NVDIMM Solid State Device (SSD) (105).

Statement 3. An embodiment of the inventive concept includes a device according to statement 1, wherein the pre-mapped memory address (610) is designed such that the host memory controller (115) transmits a target memory address (615) to the NVDIMM (105), the target memory address (615) representing a physical location of a value stored at the memory address (605).

Statement 4. An embodiment of the inventive concept includes a device according to statement 3, wherein the device driver (160) is operative to generate the pre-mapped memory address (610) from the memory address (605) responsive to the first size (205) of the exposed memory (150) in the NVDIMM (105), the base address (210) of the exposed memory (150) in the NVDIMM (105), a second size (215) of a logical segment (510, 515, 520, 525, 530, 805, 810, 815, 820) of the exposed memory (150) in the NVDIMM (105), and a memory controller operating mode (220) of the host memory controller (115).

Statement 5. An embodiment of the inventive concept includes a device according to statement 4, wherein the device driver (160) is further operative to generate the pre-mapped memory address (610) from the memory address (605) responsive to a logical-to-physical transformation (225) of the memory address (605) by the host memory controller (115).

Statement 6. An embodiment of the inventive concept includes a device according to statement 3, wherein the target memory address (615) is the memory address (605).

Statement 7. An embodiment of the inventive concept includes a device according to statement 3, wherein the target memory address (615) is an alias (705, 710) of the memory address (605).

Statement 8. An embodiment of the inventive concept includes a device according to statement 7, wherein the pre-mapped memory address (610) includes at least one changed bit (715, 720) relative to the memory address (605), the at least one changed bit (715, 720) not used by the NVDIMM (105).

Statement 9. An embodiment of the inventive concept includes a device according to statement 3, wherein the exposed memory (150) of the NVDIMM (105) is divided into non-contiguous logical segments (805, 810, 815, 820) within the memory (130) of the NVDIMM (105).

Statement 10. An embodiment of the inventive concept includes a device according to statement 3, wherein the exposed memory (150) is a subset of the memory (130).

Statement 11. An embodiment of the inventive concept includes a method, comprising:

receiving (915) a request to access a memory address (605) of a Non-Volatile Dual In-Line Memory Module (NVDIMM) (105), the NVDIMM (105) including a memory (130) and an exposed memory (150), the exposed memory (150) including a first size (205) of the exposed memory (150) and a base address (210) of the exposed memory (150);

pre-mapping (920) the memory address (605) to an intermediate address (610), the intermediate address (610) different from the memory address (605); and sending (930) the intermediate address (610) to a host memory controller (115), wherein the host memory controller (115) sends a target memory address (615) to the NVDIMM (105), the target memory address (615) representing a physical location of a value stored at the memory address (605).

Statement 12. An embodiment of the inventive concept includes a method according to statement 11, wherein receiving (915) a request to access a memory address (605) includes intercepting (910) the request from a host processor (110) to the host memory controller (115) to access the memory address (605) before the request arrives at the host memory controller (115).

Statement 13. An embodiment of the inventive concept includes a method according to statement 11, wherein receiving (915) a request to access a memory address (605) includes receiving (915) the request to access the memory address (605) of a NVDIMM Solid State Device (SSD) (105).

Statement 14. An embodiment of the inventive concept includes a method according to statement 11, wherein pre-mapping (920) the memory address (605) to an intermediate address (610) includes pre-mapping (920) the memory address (605) to the intermediate address (610) responsive to the first size (205) of the exposed memory (150) in the NVDIMM (105), the base address (210) of the exposed memory (150) in the NVDIMM (105), a second size (215) of a logical segment (510, 515, 520, 525, 530, 805, 810, 815, 820) of the exposed memory (150) in the NVDIMM (105), and a memory controller operating mode (220) of the host memory controller (115).

Statement 15. An embodiment of the inventive concept includes a method according to statement 14, wherein pre-mapping (920) the memory address (605) to the intermediate address (610) further includes pre-mapping (920) the memory address (605) to the intermediate address (610) responsive to a first size (205) of an exposed memory (150) in the NVDIMM (105), and a base address (210) of the exposed memory (150) in the NVDIMM (105), a second size (215) of a logical segment (510, 515, 520, 525, 530, 805, 810, 815, 820) of the exposed memory (150) in the NVDIMM (105), a memory controller operating mode (220) of the host memory controller (115), and a logical-to-physical transformation (225) used by the host memory controller (115).

Statement 16. An embodiment of the inventive concept includes a method according to statement 11, wherein the host memory controller (115) sends the memory address (605) to the NVDIMM (105).

Statement 17. An embodiment of the inventive concept includes a method according to statement 11, wherein pre-mapping (920) the memory address (605) to an intermediate address (610) includes pre-mapping (920, 925) the memory address (605) to an alias (705, 710) of the memory address (605).

Statement 18. An embodiment of the inventive concept includes a method according to statement 11, wherein pre-mapping (920) the memory address (605) to an intermediate address (610) includes changing (925) at least one bit in the intermediate address (610) relative to the memory address (605), the at least one changed bit (715, 720) not used by the NVDIMM (105).

Statement 19. An embodiment of the inventive concept includes a method according to statement 11, further comprising exposing (905) the exposed memory (150) to the host memory controller (115).

Statement 20. An embodiment of the inventive concept includes a method according to statement 19, wherein exposing (905) the exposed memory (150) to the host memory controller (115) includes:

identifying (1005) a contiguous block of memory (130) having the first size (205);

dividing (1010) the contiguous block of memory (130) into logical segments (510, 515, 520, 525, 530, 805, 810, 815, 820), each logical segment (510, 515, 520, 525, 530, 805, 810, 815, 820) having a second size (215); and exposing (1015) the logical segments (510, 515, 520, 525, 530, 805, 810, 815, 820) to the host memory controller (115).

Statement 21. An embodiment of the inventive concept includes a method according to statement 19, wherein exposing (905) the exposed memory (150) to the host memory controller (115) includes:

identifying (1020) a set of non-contiguous block of memory (130); and exposing (1025) the non-contiguous blocks of memory (130) to the host memory controller (115) as logical segments (510, 515, 520, 525, 530, 805, 810, 815, 820).

Statement 22. An embodiment of the inventive concept includes an article, comprising a tangible storage medium, the tangible storage medium having stored thereon non-transitory instructions that, when executed by a machine, result in:

receiving (915) a request to access a memory address (605) from an Non-Volatile Dual In-Line Memory Module (NVDIMM) (105), the NVDIMM (105) including a memory (130) and an exposed memory (150), the exposed memory (150) including a first size (205) of the exposed memory (150) and a base address (210) of the exposed memory (150);

pre-mapping (920) the memory address (605) to an intermediate address (610), the intermediate address (610) different from the memory address (605); and sending (930) the intermediate address (610) to a host memory controller (115), wherein the host memory controller (115) sends a target memory address (615) to the NVDIMM (105), the target memory address (615) representing a physical location of a value stored at the memory address (605).

Statement 23. An embodiment of the inventive concept includes an article according to statement 22, wherein receiving (915) a request to access a memory address (605) includes intercepting (910) the request from a host processor (110) to the host memory controller (115) to access the memory address (605) before the request arrives at the host memory controller (115).

Statement 24. An embodiment of the inventive concept includes an article according to statement 22, wherein receiving (915) a request to access a memory address (605) includes receiving (915) the request to access the memory address (605) from an NVDIMM Solid State Device (SSD) (105).

Statement 25. An embodiment of the inventive concept includes an article according to statement 22, wherein pre-mapping (920) the memory address (605) to an intermediate address (610) includes pre-mapping (920) the memory address (605) to the intermediate address (610) responsive to the first size (205) of the exposed memory (150) in the NVDIMM (105), the base address (210) of the exposed memory (150) in the NVDIMM (105), a second size (215) of a logical segment (510, 515, 520, 525, 530, 805, 810, 815, 820) of the exposed memory (150) in the NVDIMM (105), and a memory controller operating mode (220) of the host memory controller (115).

Statement 26. An embodiment of the inventive concept includes an article according to statement 25, wherein pre-mapping (920) the memory address (605) to the intermediate address (610) further includes pre-mapping (920) the memory address (605) to the intermediate address (610) responsive to a first size (205) of an exposed memory (150) in the NVDIMM (105), and a base address (210) of the exposed memory (150) in the NVDIMM (105), a second size (215) of a logical segment (510, 515, 520, 525, 530, 805, 810, 815, 820) of the exposed memory (150) in the NVDIMM (105), a memory controller operating mode (220) of the host memory controller (115), and a logical-to-physical transformation (225) used by the host memory controller (115).

Statement 27. An embodiment of the inventive concept includes an article according to statement 22, wherein the host memory controller (115) sends the memory address (605) to the NVDIMM (105).

Statement 28. An embodiment of the inventive concept includes an article according to statement 22, wherein pre-mapping (920) the memory address (605) to an intermediate address (610) includes pre-mapping (920, 925) the memory address (605) to an alias (705, 710) of the memory address (605).

Statement 29. An embodiment of the inventive concept includes an article according to statement 22, wherein pre-mapping (920) the memory address (605) to an intermediate address (610) includes changing (925) at least one bit in the intermediate address (610) relative to the memory address (605), the at least one changed bit (715, 720) not used by the NVDIMM (105).

Statement 30. An embodiment of the inventive concept includes an article according to statement 22, wherein the tangible storage medium has stored thereon further non-transitory instructions that, when executed by the machine, result in exposing (905) the exposed memory (150) to the host memory controller (115).

Statement 31. An embodiment of the inventive concept includes an article according to statement 30, wherein exposing (905) the exposed memory (150) to the host memory controller (115) includes:

identifying (1005) a contiguous block of memory (130) having the first size (205);

dividing (1010) the contiguous block of memory (130) into logical segments (510, 515, 520, 525, 530, 805, 810, 815, 820), each logical segment (510, 515, 520, 525, 530, 805, 810, 815, 820) having a second size (215); and exposing (1015) the logical segments (510, 515, 520, 525, 530, 805, 810, 815, 820) to the host memory controller (115).

Statement 32. An embodiment of the inventive concept includes an article according to statement 30, wherein exposing (905) the exposed memory (150) to the host memory controller (115) includes:

identifying (1020) a set of non-contiguous block of memory (130); and exposing (1025) the non-contiguous blocks of memory (130) to the host memory controller (115) as logical segments (510, 515, 520, 525, 530, 805, 810, 815, 820).

Consequently, in view of the wide variety of permutations to the embodiments described herein, this detailed description and accompanying material is intended to be illustrative only, and should not be taken as limiting the scope of the inventive concept. What is claimed as the inventive concept, therefore, is all such modifications as may come within the scope and spirit of the following claims and equivalents thereto.

What is claimed is:

1. A device, comprising:
a Non-Volatile Dual In-Line Memory Module (NVDIMM) installed in a Dual In-Line Memory Module (DIMM) socket, the NVDIMM including a memory and an exposed memory, the exposed memory including a first size of the exposed memory and a base address of the exposed memory; and
a device driver operating on a host processor, the device driver operative to intercept a memory address destined for a host memory controller and replace the memory address with a pre-mapped memory address in a request sent to the host memory controller, the pre-mapped memory address different from the memory address,
wherein the exposed memory includes a directly addressable memory.

2. A device according to claim 1, wherein the NVDIMM includes an NVDIMM Solid State Device (SSD).

3. A device according to claim 1, wherein the pre-mapped memory address is designed such that the host memory controller transmits a target memory address to the NVDIMM responsive to the pre-mapped memory address, the target memory address including a physical location of a value stored at the memory address.

4. A device according to claim 3, wherein the device driver is operative to generate the pre-mapped memory address from the memory address responsive to the first size of the exposed memory in the NVDIMM, the base address of the exposed memory in the NVDIMM, a second size of a logical segment of the exposed memory in the NVDIMM, and a memory controller operating mode of the host memory controller.

5. A device according to claim 3, wherein the pre-mapped memory address is an alias of a second pre-mapped memory address,
wherein the pre-mapped memory address is different from the second pre-mapped memory address and the host memory controller maps both the pre-mapped memory address and the second pre-mapped memory address to the target memory address.

6. A device according to claim 5, wherein the pre-mapped memory address includes at least one changed bit relative to the second pre-mapped memory address, the at least one changed bit not impacting the target memory address transmitted from the host memory controller to the NVDIMM.

7. A method, comprising:
receiving a request to access a memory address of a Non-Volatile Dual In-Line Memory Module (NVDIMM), the NVDIMM including a memory and an exposed memory, the exposed memory including a first size of the exposed memory and a base address of the exposed memory;
pre-mapping the memory address to an intermediate address, the intermediate address different from the memory address; and
sending the intermediate address to a host memory controller,
wherein the host memory controller sends a target memory address to the NVDIMM, the target memory address representing a physical location of a value stored at the memory address.

8. A method according to claim 7, wherein receiving a request to access a memory address includes receiving the request to access the memory address of an NVDIMM Solid State Device (SSD).

9. A method according to claim 7, wherein pre-mapping the memory address to an intermediate address includes pre-mapping the memory address to the intermediate address responsive to the first size of the exposed memory in the NVDIMM, the base address of the exposed memory in the NVDIMM, a second size of a logical segment of the exposed memory in the NVDIMM, and a memory controller operating mode of the host memory controller.

10. A method according to claim 7, wherein pre-mapping the memory address to an intermediate address includes pre-mapping the memory address to an alias of a second intermediate address,
wherein the intermediate address is different from the second intermediate address and the host memory controller maps both the intermediate address and the second intermediate address to the target memory address.

11. A method according to claim 10, wherein pre-mapping the memory address to an intermediate address includes changing at least one bit in the intermediate address relative to the second intermediate address, the at least one changed bit not impacting the target memory address transmitted from the host memory controller to the NVDIMM.

12. A method according to claim 7, further comprising exposing the exposed memory to the host memory controller.

13. A method according to claim 12, wherein exposing the exposed memory to the host memory controller includes:
identifying a contiguous block of memory having the first size;
dividing the contiguous block of memory into logical segments, each logical segment having a second size; and
exposing the logical segments to the host memory controller.

14. A method according to claim 7, wherein the target memory address is responsive to the intermediate address and includes the physical location of the value stored at the memory address.

15. A method according to claim 7, wherein the exposed memory includes a directly addressable memory.

16. An article, comprising a non-transitory storage medium, the tangible storage medium having stored thereon instructions that, when executed by a machine, result in:
receiving a request to access a memory address of a Non-Volatile Dual In-Line Memory Module (NVDIMM), the NVDIMM including a memory and an exposed memory, the exposed memory including a first size of the exposed memory and a base address of the exposed memory;
pre-mapping the memory address to an intermediate address, the intermediate address different from the memory address; and
sending the intermediate address to a host memory controller,
wherein the host memory controller sends a target memory address to the NVDIMM, the target memory address responsive to the intermediate address and including a physical location of a value stored at the memory address, and wherein the exposed memory includes a directly addressable memory.

17. An article according to claim 16, wherein pre-mapping the memory address to an intermediate address includes pre-mapping the memory address to the intermediate address responsive to the first size of the exposed memory in the NVDIMM, the base address of the exposed memory in the NVDIMM, a second size of a logical segment of the exposed memory in the NVDIMM, and a memory controller operating mode of the host memory controller.

18. An article according to claim 16, wherein pre-mapping the memory address to an intermediate address includes pre-mapping the memory address to an alias of a second intermediate address, wherein the intermediate address is different from the second intermediate address and the host memory controller maps both the intermediate address and the second intermediate address to the target memory address.

19. An article according to claim 16, wherein pre-mapping the memory address to an intermediate address includes changing at least one bit in the intermediate address relative to the second intermediate address, the at least one changed bit not impacting the target memory address transmitted from the host memory controller to the NVDIMM.

* * * * *